(12) United States Patent
Pande et al.

(10) Patent No.: US 11,005,269 B2
(45) Date of Patent: May 11, 2021

(54) SYSTEMS, APPARATUS, AND METHODS FOR LOAD SHARING BETWEEN ISOCHRONOUS GENERATORS AND BATTERY ENERGY STORAGE SYSTEMS IN ISLANDED MICROGRIDS

(71) Applicant: Siemens Aktiengesellschaft, Munich (DE)

(72) Inventors: Shashank Pande, Maple Grove, MN (US); Ye Ma, Prairie, MN (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 297 days.

(21) Appl. No.: 15/665,488

(22) Filed: Aug. 1, 2017

(65) Prior Publication Data

US 2019/0044342 A1    Feb. 7, 2019

(51) Int. Cl.
*H02J 3/18* (2006.01)
*H02J 3/32* (2006.01)
(Continued)

(52) U.S. Cl.
CPC .............. *H02J 3/46* (2013.01); *G05B 13/021* (2013.01); *H02J 3/1885* (2013.01); *H02J 3/32* (2013.01); *H02J 3/003* (2020.01); *H02J 3/388* (2020.01)

(58) Field of Classification Search
CPC .... H02J 3/46; H02J 3/1885; H02J 3/32; H02J 2003/003; H02J 3/003; H02J 3/388; G05B 13/021; Y02E 70/30
See application file for complete search history.

(56) References Cited

U.S. PATENT DOCUMENTS

| 2002/0064010 A1 | 5/2002 | Nelson et al. |
| 2008/0143304 A1 | 6/2008 | Bose et al. |

(Continued)

FOREIGN PATENT DOCUMENTS

| CA | 2940212 A1 | 8/2015 |
| WO | 2013106906 A1 | 7/2013 |

OTHER PUBLICATIONS

Brabandere et al. A Voltage and Frequency Droop Control Method for Parallel Inverters, 2004, pp. 2501-2507 downloaded from the internet "http://www.cpdee.ufmg.br/~troliveira/docs/aulas/fontes/A_Voltage_and_Frequency_Droop_Control_Me.pdf" (Year: 2004).*

(Continued)

*Primary Examiner* — Jason Lin
*Assistant Examiner* — Olvin Lopez Alvarez

(57) ABSTRACT

Embodiments provide for controlling power production in an islanded microgrid system while maintaining the system frequency and implementing desired load sharing between different types of generating resources and energy storage systems. Embodiments include a controller in communication with the resources to control operation of the resources and operative to determine an optimal load balance based on load and renewable generation forecast information; transmit load and generation schedules to a generation controller that operates the resources in accordance with the schedules; calculate a frequency set point for energy storage resources in the microgrid based on the optimal load balance of the energy storage resources, droop settings, rated power, and the frequency of the energy storage resources; and to control the frequency set point of the energy storage resources to achieve the optimal load balance. Numerous additional aspects are disclosed.

14 Claims, 8 Drawing Sheets

(51) Int. Cl.
*H02J 3/46* (2006.01)
*G05B 13/02* (2006.01)
*H02J 3/00* (2006.01)
*H02J 3/38* (2006.01)

(56) References Cited

U.S. PATENT DOCUMENTS

| | | | | |
|---|---|---|---|---|
| 2015/0241893 | A1* | 8/2015 | Hajimiragha | G05F 1/66 700/297 |
| 2017/0187188 | A1* | 6/2017 | Aubert Guyon | H02J 3/382 |
| 2017/0322578 | A1* | 11/2017 | Baone | G05B 19/042 |
| 2018/0173171 | A1* | 6/2018 | Lin | G05B 13/021 |
| 2018/0248374 | A1* | 8/2018 | Jung | H02J 3/381 |

OTHER PUBLICATIONS

Zhao et al, "Fuzzy logic based coordinated control of battery energy storage system and dispatchable distributed generation for microgrid", 2015 pp. 422-428 downloaded from the internet https://ieeexplore.ieee.org/document/9005354 (Year: 2015).*

Kim et al, "Cooperative Control Strategy of Energy Storage System and Microsources for Stabilizing the Microgrid during Islanded Operation", 2010, pp. 3037-3048, downloaded from the internet https://ieeexplore.ieee.org/document/5580122?arnumber=5580122 (Year: 2010).*

Zhang et al, "A New Seamless Transfer Control Strategy of the Microgrid", 2014, pp. 1-9, downloaded from the internet https://www.researchgate.net/publication/263430242_A_New_Seamless_Transfer_Control_Strategy_of_the_Microgrid (Year: 2014).*

Alegria et al, "CERTS Microgrid Demonstration With Large-Scale Energy Storage and Renewable Generation", 2014, pp. 937-943, downloaded from the internet https://ieeexplore.ieee.org/document/6670071 (Year: 2014).*

Jagaduri, "Review of Integrating and Controlling Distributed Energy Resources", 2020, pp. 14, downloaded from the https://tsdos.org/2020/media/RekhaJagaduri_2020TSDOS.pdf (Year: 2020).*

Thomee, "Lithium-Ion Battery Storage for Frequency Control", 2018, pp. 101, downloaded from the internet Lithium-Ion Battery Storage for Frequency Control (Year: 2018).*

Manish et al, "Real-time Modeling and Testing of Microgrid Management System for the Blue Lake Rancheria—Performance Assurance Report", Nov. 2017, pp. 54, downloaded from the internet https://www.osti.gov/servlets/purl/1426889 (Year: 2017).*

Manish et al, "Real-time Modeling and Testing of Microgrid Management System for the Blue Lake Rancheria—Performance Assurance Report", Nov. 2017, p. 54, downloaded from the internet https://www.osti.gov/servlets/purl/1426889 (Year: 2017).*

Aghamohammadi Mohammad Reza et al: "A new approach for optimal sizing of battery energy storage system for primary frequency control of islanded Microgrid", International Journal of Electrical Power & Energy Systems, vol. 54, Dec. 31, 2013 (Dec. 31, 2013),-Dec. 31, 2013 (Dec. 31, 2013), pp. 325-333, XP028727163; ISSN: 0142-0615, DOI: 10.1016/J.IJEPES.2013.07.005.

Mercier P. et al: "Optimizing a Battery Energy Storage System for Frequency Control Application in an Jsolated Power System", IEEE Transactions on Power Systems., vol. 24, No. 3, Aug. 1, 2009 (Aug. 1, 2009) , pp. 1469-1477, XP055533616; US ISSN: 0885-8950, DOI: 10.1109/TPWRS.2009.2022997.

Jong-Yul Kim et al: "Cooperative Control Strategy of Energy Storage System and Microsources for Stabilizing the Microgrid during Islanded Operation", IEEE Transactions on Power Electronics, Institute of Electrical and Electronics Engineers, USA, vol. 25, No. 12, Dec. 1, 2010 (Dec. 1, 2010), pp. 3037-3048, XP011343835, ISSN: 0885-8993, DOI: 10.1109/TPEL.2010.2073488.

Koller Michael et al: "Review of grid applications with the Zurich IMW battery energy storage system", Electric Power Systems Research, Elsevier, Amsterdam, NL, vol. 120, Jul. 30, 2014 (Jul. 30, 2014), pp. 128-135, XP029123435; ISSN: 0378-7796, DOI: 10.1016/J.EPSR.2014.06.023.

Cody A Hill et al: "Battery Energy Storage for Enabling Integration of Distributed Solar Power Generation"; IEEE Transactions on Smart Grid; IEEE,; USA; vol. 3,; No. 2; pp. 850-857; XP011445369, ISSN: 1949-3053; DOI: 10.1109/rSG.2012.2190113.

* cited by examiner

SYSTEMS, APPARATUS, AND METHODS FOR LOAD SHARING BETWEEN ISOCHRONOUS GENERATORS AND BATTERY ENERGY STORAGE SYSTEMS IN ISLANDED MICROGRIDS

FIELD

The present invention relates to operating energy systems, and more specifically to systems, apparatus, and methods for load sharing between isochronous generators and battery energy storage systems in islanded microgrids.

BACKGROUND

A microgrid is a small-scale power grid that is able to provide electricity to its local area (e.g., campus or neighborhood) and can operate independently (e.g., when islanded) or in conjunction with a substantially larger area's (e.g., a town's or a city's) main electrical grid. Microgrids are typically relatively low voltage power systems that include a number of loads and generators. Power generation systems using renewable resources can be integrated into a microgrid efficiently. However, due to the variable nature of renewable sources and fluctuating load profiles, the power supply in the microgrid sometimes cannot match the load demand. Imbalances between generation and load can result in system frequency fluctuation and in microgrids the problem is compounded due to the relatively low inertia and small time constant of the system. Therefore, frequency control is critical in islanded microgrids.

Battery energy storage systems which have high efficiency and large energy density are considered to be an effective solution for power balancing in an islanded microgrid. Many studies suggest that batteries can be used in microgrids to shave peak demand, store surplus renewable energy, improve both power quality and frequency control. Thus, what is needed are systems, apparatus, and methods for load sharing between isochronous generators and battery energy storage systems in islanded microgrids.

SUMMARY

In some embodiments, a power distribution system is provided. The system includes a plurality of power generating and energy storage resources operating within a microgrid; a plurality of power consuming loads within the microgrid; a power transmission network coupling the resources to the loads; and a controller in communication with the resources and configured to control operation of the resources within the microgrid when the microgrid is islanded. The controller is operative to determine an optimal load balance between the plurality of generation assets and energy storage systems via a microgrid optimization module within the controller based on load and renewable generation forecast information; transmit load and generation schedules from the microgrid optimization module to a generation controller that operates the resources in accordance with the schedules; calculate a frequency set point for energy storage resources in the microgrid based on the optimal load balance of the energy storage resources, the energy storage resources' droop settings, the rated power of the energy storage resources, and the frequency of the energy storage resources; and control the frequency set point of the energy storage resources to achieve the optimal load balance.

In some other embodiments, a method of controlling an islanded microgrid is provided. The method includes determining an optimal load balance between a plurality of generation assets and energy storage systems via a microgrid optimization module implemented within a controller based on load and renewable generation forecast information, wherein the optimal load balance includes load and generation schedules; transmitting the load and generation schedules from the microgrid optimization module to a generation controller that operates the plurality of generation assets and energy storage systems in accordance with the schedules; calculating a frequency set point for the energy storage systems in the microgrid based on the optimal load balance of the energy storage systems, the energy storage systems' droop settings, the rated power of the energy storage systems, and the frequency of the energy storage systems; and controlling the frequency set point of the energy storage systems to achieve the optimal load balance.

In yet other embodiments, an islanded microgrid controller is provided. The islanded microgrid controller includes a microgrid optimization module operative to determine an optimal load balance between a plurality of generation assets and energy storage systems based on load and renewable generation forecast information and to calculate a frequency set point for the energy storage systems based on the optimal load balance of the energy storage systems, droop settings of the energy storage systems, rated power of the energy storage systems, and frequency of the energy storage systems; a load and generation forecast module operative to provide the load and renewable generation forecast information to the microgrid optimization module; and a generation controller coupleable to the plurality of generation assets and energy storage systems and in two way communication with the microgrid optimization module, wherein the generation controller is operative to receive load and generation schedules from the microgrid optimization module, to operate the plurality of generation assets and energy storage systems in accordance with the schedules, and to control the frequency set point of the energy storage systems to achieve the optimal load balance.

Still other features, aspects, and advantages of embodiments will become more fully apparent from the following detailed description, the appended claims, and the accompanying drawings by illustrating a number of exemplary embodiments and implementations, including the best mode contemplated for carrying out the embodiments. Embodiments may also be capable of other and different applications, and several details may be modified in various respects, all without departing from the spirit and scope of the disclosed embodiments. Accordingly, the drawings and descriptions are to be regarded as illustrative in nature, and not as restrictive. The drawings are not necessarily drawn to scale. The description is intended to cover all modifications, equivalents, and alternatives falling within the spirit and scope of the claims.

DESCRIPTION

Figure 1:
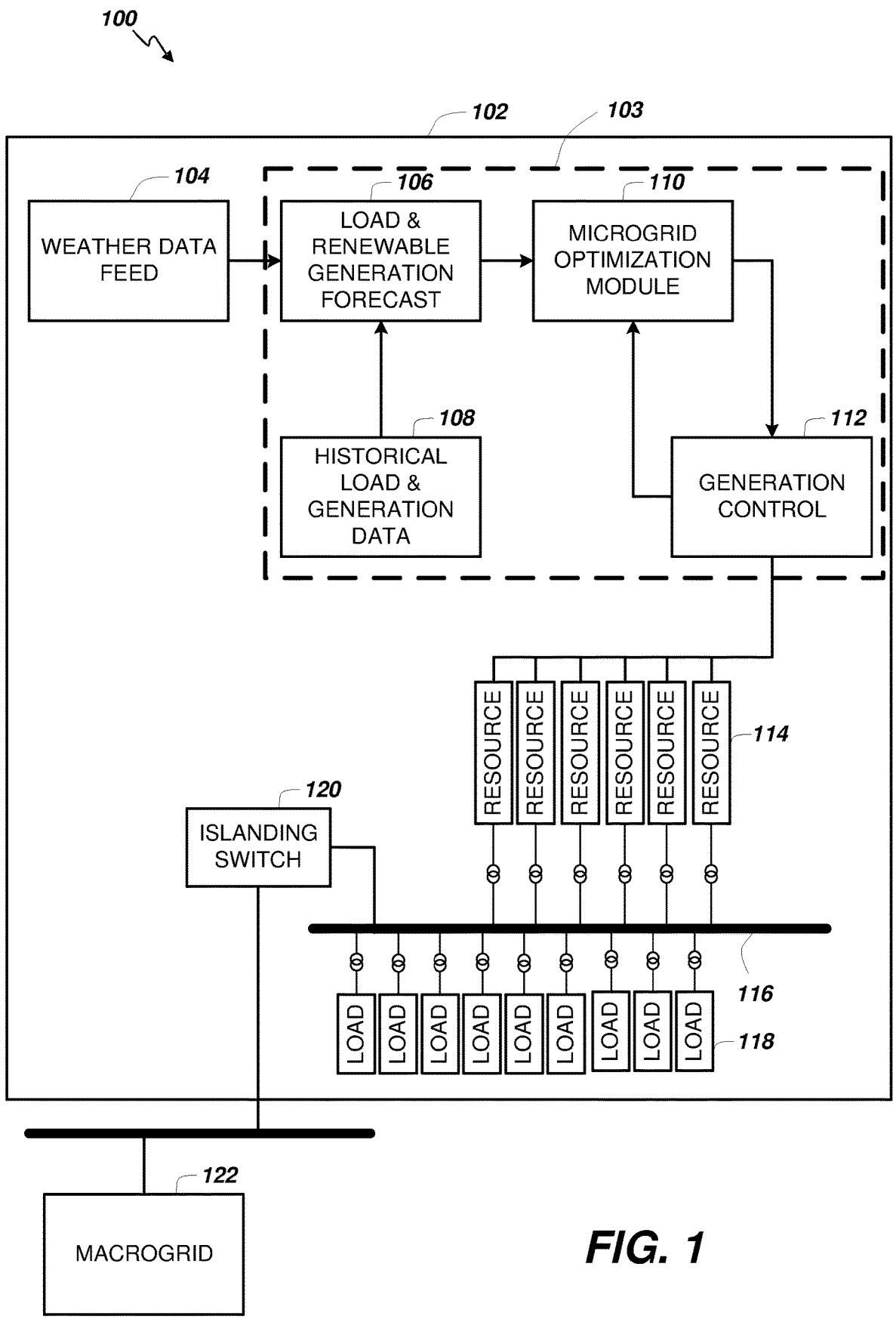
FIG. 1 is a block diagram depicting an example power system according to some embodiments.

Embodiments disclosed herein describe an energy management system enhanced to enable load sharing between isochronous generators and battery energy storage systems (BESS) in islanded microgrids. FIG. 1 depicts an example of a power system 100 according to various embodiments. The power system 100 includes a microgrid 102. The microgrid 102 includes a controller 103 that can be implemented as a computer or a system of networked computers and databases. The controller 103 is adapted to receive a weather data feed 104 that supplies weather data to a load and generation forecast module 106 (within the controller 103) that also receives historical information from a historical load and generation database 108. The load and generation forecast module 106 provides forecast information to a microgrid optimization module (MOM 110) implemented within the controller 103. The MOM 110 in turn provides operating instructions (e.g., control schedules) to a generation controller 112 which directly operates the microgrid resources 114 to output power on the microgrid's power transmission line 116 to meet the microgrid's loads 118. As will be discussed in more detail below, the microgrid resources 114 can include a mixture of conventional generators such as diesel and gas fired generators, renewable resources such as solar photovoltaic (PV) and wind turbines, and battery storage systems. The generation controller 112 also provides feedback to the MOM 110 to allow the MOM 110 to further refine the operating instructions based on the actual activity of the generation controller 112. An islanding switch 120 is operable to disconnect the microgrid 102 from the macrogrid 122 to island the microgrid 102 from the rest of the power system 100.

Under normal conditions, power utilities and Independent System Operators (ISO) control generating assets in their control areas in order to meet, for example, the North American Electric Reliability Corporation (NERC) mandated CPS1 and CPS2 control performance standards. Under abnormal conditions, such as islanding conditions, a control area may split into multiple islanded microgrids. A primary objective while operating in islanded mode is to ensure that the generation control for the microgrid is smooth and stable. There are several different modes in which islanded microgrid resources can be operated: P/Q mode, V/F mode, isochronous mode, and frequency droop mode.

In power (P) and reactive power (Q) mode (P/Q mode) an external system such as a supervisory control and data acquisition (SCADA) system can provide active power and reactive power set points to a BESS resource controller and the resource controller controls the output P and Q of the resource to match the given set points. SCADA is a control system architecture that uses computers, networked data communications and graphical user interfaces for high-level process supervisory management.

In frequency (F) and voltage (V) mode (V/F mode) an external system such as a SCADA system can provide frequency (F) and voltage (V) set points to a BESS resource controller and the resource controller controls the output P and Q such that the terminal voltage and frequency match the given set points.

In islanded mode, a diesel or other fuel based generator (e.g., gas turbine) can be operated in isochronous mode. Isochronous mode is essentially V/F mode where the generator rotates at a fixed speed irrespective of the load on it and keeps the frequency fixed at, for example, 60 Hz in the US. Similarly, the terminal voltage is held fixed at a nominal voltage by adjusting the reactive power output of the generator.

In frequency droop mode, the frequency or speed of the generator drops in proportion to the load on the generator. This means the frequency of the output power drops in proportion to the load on the generator. The frequency droop is often expressed as percentage drop in frequency for 1 per-unit (p.u.) load on the generator. The frequency-droop scheme is used for load sharing among multiple generators. Similar schemes can be adapted for reactive power sharing (e.g., voltage droop).

Figure 2:
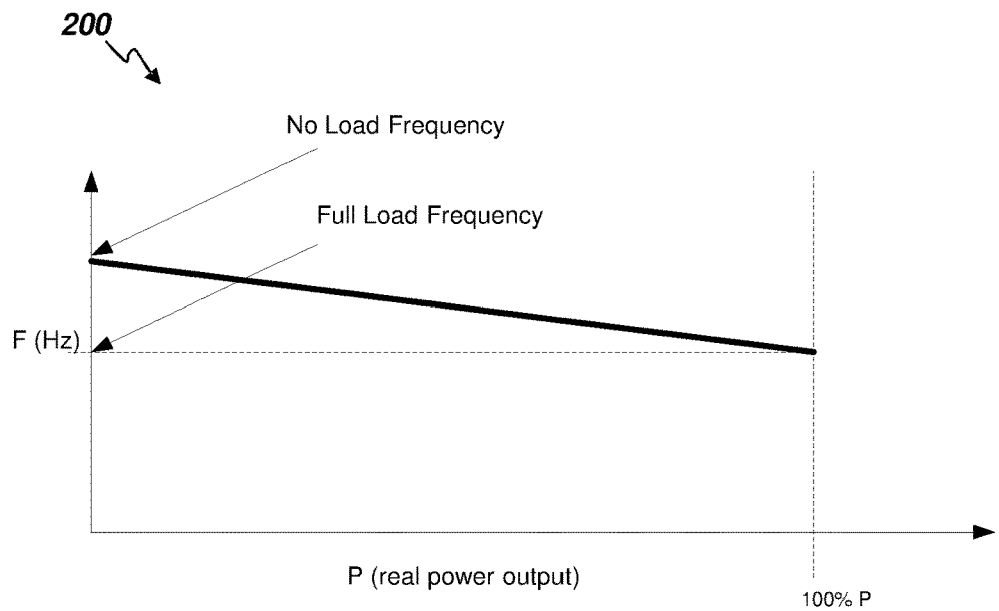
FIG. 2 is a graph depicting an example frequency droop characteristic of generator according to some embodiments.

In conventional islanded microgrid operation, a rotating machine such as a diesel generator set or a gas turbine is typically used to maintain the frequency of the microgrid. The frequency of the microgrid is maintained by controlling the speed of the rotating machines by increasing or decreasing the fuel input to the generator sets. There are primarily two methods of frequency control of islanded microgrids, frequency droop mode and isochronous mode. In frequency droop mode, as the load on the generator increases, the frequency of the generator (and hence the frequency of the power in the microgrid) slows down by a predetermined factor called generator droop. FIG. 2 is a graph 200 of real power output of a generator plotted versus frequency, illustrating an example of a frequency droop characteristic of the generator. Generator droop is often specified by a percentage change in frequency from no load to full load operation of the generator.

Figure 3:
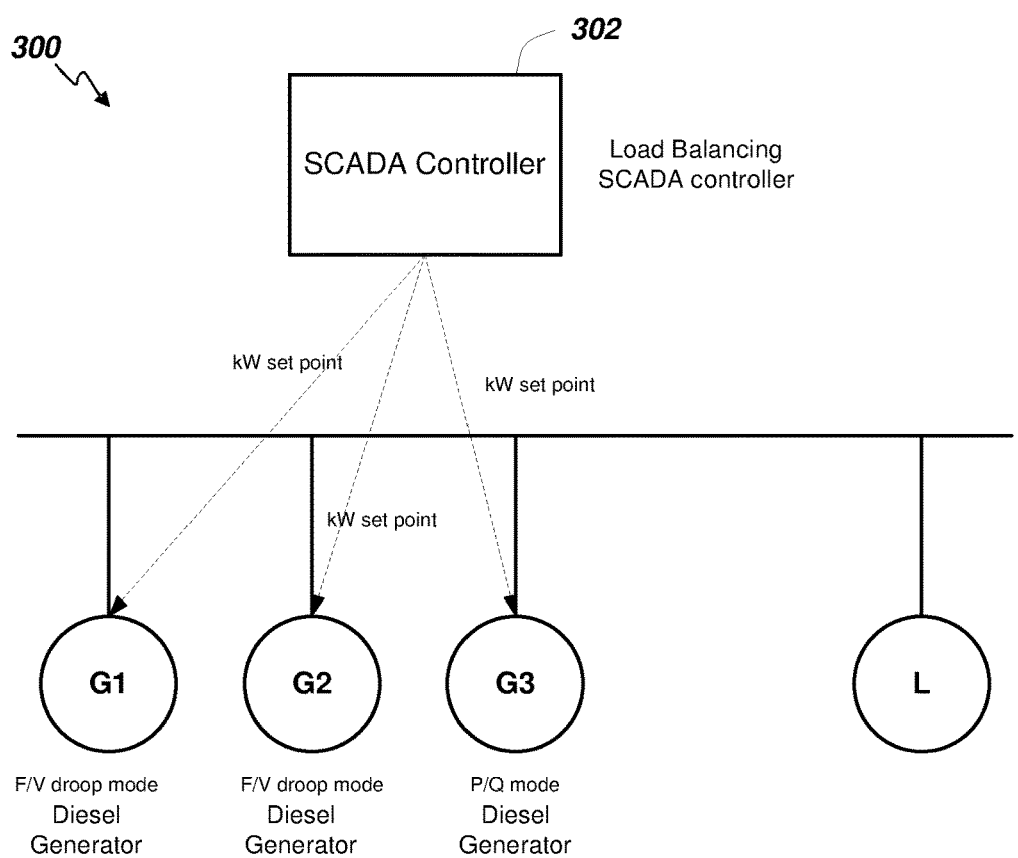
FIG. 3 is a block diagram depicting a system using frequency control and load sharing with diesel generators in frequency/voltage (F/V) droop mode according to some embodiments.

As illustrated in the example system 300 of FIG. 3, multiple generators G1, G2 can operate in frequency droop mode and the generators G1, G2 share the load L based on the predetermined droop settings of the generators G1, G2. In some embodiments, other generators G3 operating in P/Q mode, can also be employed to share the load L. Load balancing can be managed by a SCADA controller 302 that sends active power set points to the generators G1, G2, G3. The load sharing can be further managed by an Automatic Generation Control (AGC) system at a higher control hierarchy level. The AGC can likewise send active power set points to the generators G1, G2, G3 to balance the load among the generators G1, G2, G3 as desired.

Figure 4:
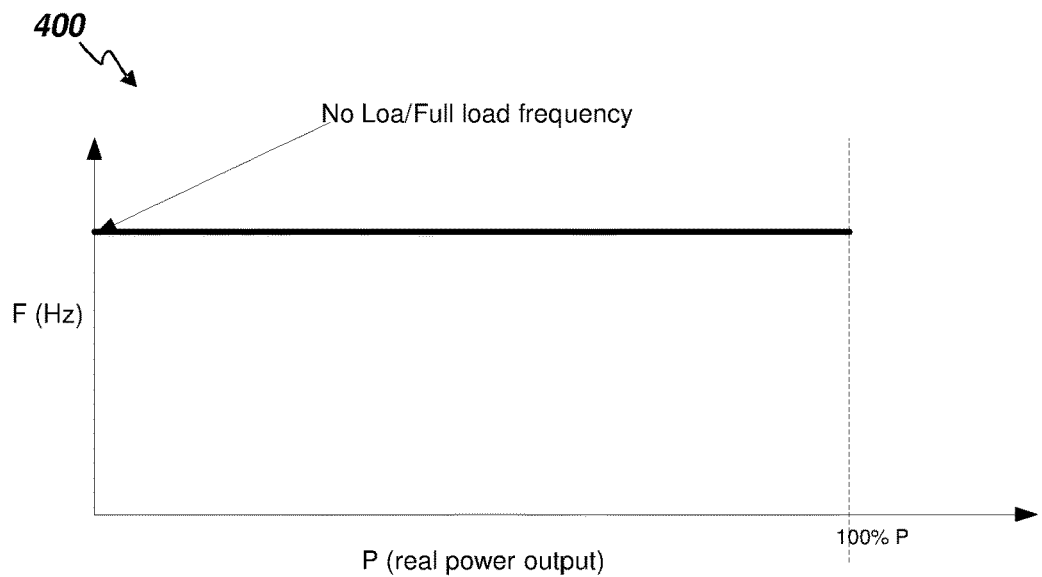
FIG. 4 is a graph depicting an example frequency droop characteristic of an isochronous generator according to some embodiments.
Figure 5:
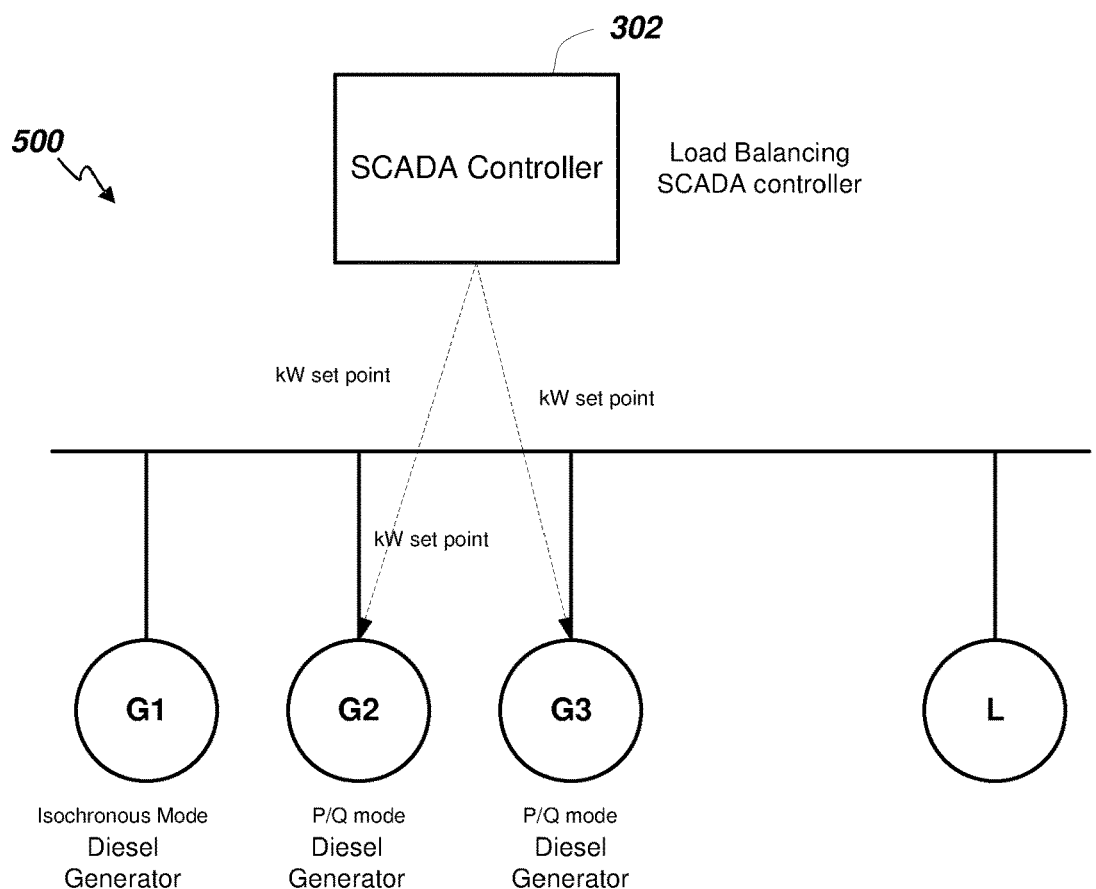
FIG. 5 is a block diagram depicting a system using frequency control and load sharing with diesel generators in isochronous mode according to some embodiments.

In the isochronous mode of operation, one or more generators operate at zero droop, i.e. the frequency of the generators does not change depending on loading of the generators. This is illustrated by the graph 400 of FIG. 4. Load sharing is performed via communication between generator controllers, or only one controller controlling all of the isochronous generators is used. As illustrated in FIG. 5, the isochronous generator G1 does not accept any set points from external systems such as a SCADA controller 302. In such an arrangement, the load sharing can be performed by the SCADA controller 302 changing the output of other generators G2, G3 that are operating in P/Q mode by sending updated power set points. In this arrangement, all load L changes are compensated for by the isochronous generator G1.

A diesel generator set (or any other rotating generator) is an inherently an alternating current (AC) machine. The speed of the generator determines the frequency of generator's output voltage. Thus, the system frequency is stable when mechanical input and electrical output power on the mechanical shaft of the generator are equal and stable kinetic energy is maintained. To increase the frequency and/or power output of a diesel generator, the fuel input to the prime mover (e.g., the diesel engine) is increased. Due to this dependent relationship, regardless of whether the generator is operating in V/F droop mode or P/Q mode, the generator can accept active power (kW) set points and the output power and frequency can be changed.

In contrast to diesel generators, a BESS is inherently a direct current (DC) machine. The DC power is converted to AC power using an inverter and the alternating frequency is simulated by electronic switching circuits. Thus, the mechanism to change frequency in a BESS is a different mechanism than that used to change power output. The power output of a BESS is changed by changing the DC bus voltage of the BESS or by simply changing the DC current output.

When a BESS is operating in F/V droop mode, the BESS does not accept kW set points. The BESS output is strictly determined by the frequency of the system. If the BESS is the only source for a frequency reference in the system, then the system frequency can be varied by sending a frequency set point to the BESS.

Referring back to FIG. 1, in operation, the microgrid optimization module (MOM 110) determines the generation schedules, e.g., the load sharing among the microgrid generation and storage assets (i.e., the resources 114) based on the forecast information from the load and renewable generation forecast module 106 using information from the historical load and generation database 108 and the weather data feed 104. The load sharing is specified in terms of active power output (e.g., in kW) of each resource 114. When resources 114 are in P/Q mode an active power set point can be sent to the resource 114. As discussed above, for diesel generators, a kW set point can be sent even when the resource 114 is operating in F/V droop mode. However, in the case of resources 114 such as a BESS that is operating in F/V droop mode, such resources 114 do not accept active power (e.g., kW) set points. Therefore, the load sharing is achieved by sending appropriate frequency set points to BESS resources 114.

Figure 6:
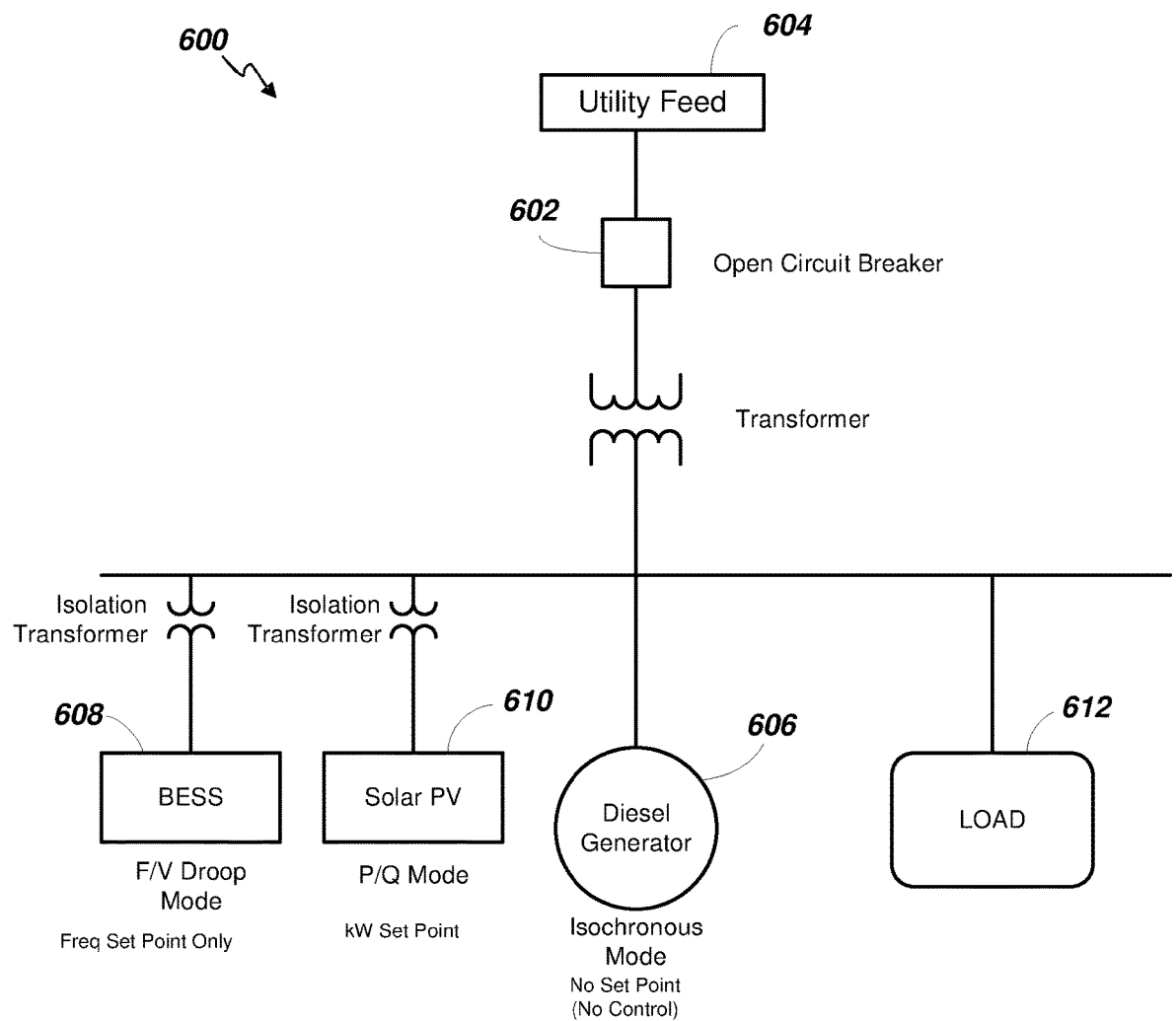
FIG. 6 is a block diagram depicting an example microgrid power system according to some embodiments.

Consider an example islanded microgrid system 600 as depicted in FIG. 6. In the pictured microgrid configuration, the circuit breaker 602 between the utility feed 604 and the islanded microgrid system 600 is open so that the microgrid system 600 is disconnected from the utility feed 604. The microgrid system 600 includes a diesel generator 606 functioning as a generating source operating as an isochronous generator. The diesel generator 606 does not accept any set points and thus, the only control options available for this generator 606 are start and stop. A BESS 608 operating in F/V droop mode with a non-zero droop setting is also present in this example. The BESS 608 accepts only frequency set points as illustrated. The example microgrid system 600 further includes a solar PV unit 610 that operates in P/Q mode and accepts active power (e.g., kW) set points.

The microgrid optimization module (MOM 110, FIG. 1) determines the load sharing among the microgrid resources such that:

Load(kW)=$P_{diesel}$(kW)+$P_{solar}$(kW)+$P_{bess}$(kW)

Figure 7:
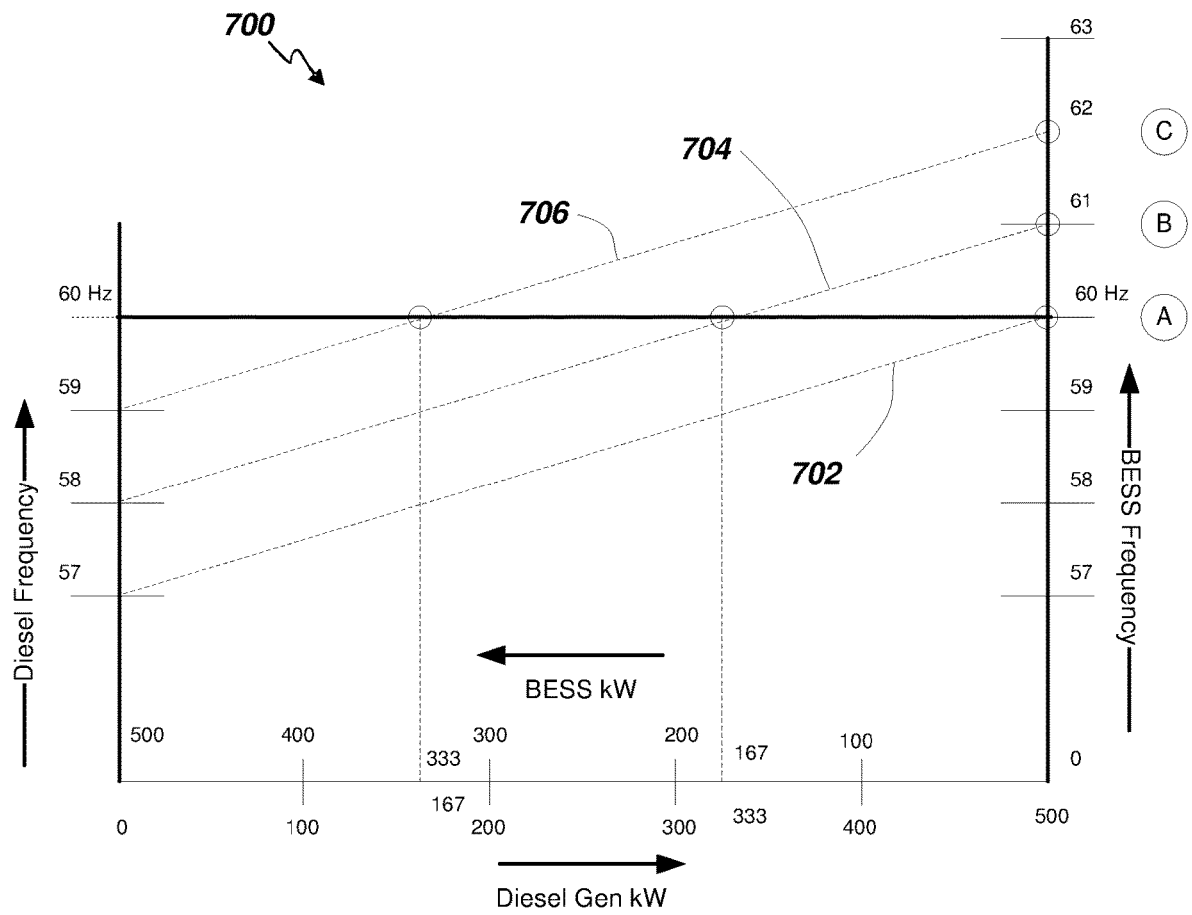
FIG. 7 is a graph depicting an example of controlling load sharing between an isochronous generator and a battery energy storage system (BESS) using frequency set points according to some embodiments.

The load sharing suggested by the MOM 110 is not easily implemented because the diesel generator 606 and the BESS 608 do not accept kW set points and only the solar PV unit 610 accepts kW set points. According to embodiments, an example solution to implement optimized load sharing among the assets is to vary the frequency set point of the BESS 608 such that the desired load sharing is achieved. The graph 700 in FIG. 7 depicts an example 500 kW total load shared between the BESS 608 and the isochronous diesel generator 606. The BESS 608 droop is set to 5% (i.e., a 5% change in frequency for 100% change in output). The example BESS 608 rated power is 500 kW and the rated frequency is 60 Hz.

As illustrated in the example of FIG. 7, the load sharing between the isochronous diesel generator 606 and the BESS 608 in frequency-droop mode can be changed by changing the frequency set point of the BESS 608. The BESS 608 power output is governed by the following equation:

$$P_{bess} = P_{rated}^{bess} \times \frac{(F_{setpt} - F_{system})}{Droop_{bess} \times F_{rated}^{bess}}$$

Three illustrative example load sharing scenarios A through C are depicted in FIG. 7. In example scenario A represented by dashed line 702, the BESS Frequency Set Point is 60 Hz. When the BESS frequency set point is 60 Hz, the diesel generator 606 carries the entire load of 500 kW as shown in FIG. 7 and as confirmed by the above equation for $P_{bess}$.

In example scenario B represented by dashed line 704, the BESS Frequency Set Point is 61 Hz. When the BESS frequency set point is 61 Hz, the diesel generator 606 carries 333 kW and the BESS carries 167 kW of the load as shown in FIG. 7 and as confirmed by the above equation for $P_{bess}$.

In example scenario C represented by dashed line 706, the BESS Frequency Set Point is 62 Hz. When the BESS frequency set point is 62 Hz, the diesel generator 606 carries 167 kW and the BESS carries 333 kW of the load as shown in FIG. 7 and as confirmed by the above equation for $P_{bess}$.

From these examples, the frequency set point for the BESS can be calculated given the desired load sharing by the BESS, the BESS droop setting, and rated power and frequency of the BESS as follows:

$$\frac{F_{Setpt} - F_{system}}{Droop_{bess} \times F_{Rated}} = \frac{P_{desired}}{P_{Rated}}$$

Where $F_{setpt}$ represents the BESS Frequency set point (Hz); $F_{system}$ represents the System frequency (Hz); $Droop_{bess}$ represents the P. U. Droop setting for the BESS; $F_{Rated}$ represents the BESS rated frequency (Hz); $P_{desired}$ represents the Desired power sharing by the BESS; and $P_{Rated}$ represents the Rated power of BESS.

The frequency set point ($F_{setpt}$) for the BESS can be derived base on the following equation:

$$F_{setpt} = \frac{P_{desired} \times Droop_{bess} \times F_{rated}}{P_{rated}} + F_{system}$$

Thus, given a desired load sharing by the BESS (or any inverter based energy generation or storage unit) in frequency-droop mode with frequency set point control, the load sharing can be achieved by calculating an appropriate set point via the above equation for $F_{setpt}$ and controlling the frequency set point to achieve the desired load sharing. No control is necessary for the isochronous generators to effect the load sharing. This method can be implemented as a closed loop load frequency control algorithm that maintains the system frequency and implements desired load sharing between different types of generating or energy storage units. Further, this method can be generalized for multiple inverter based resources and isochronous generators in any size islanded microgrid.

Figure 8:
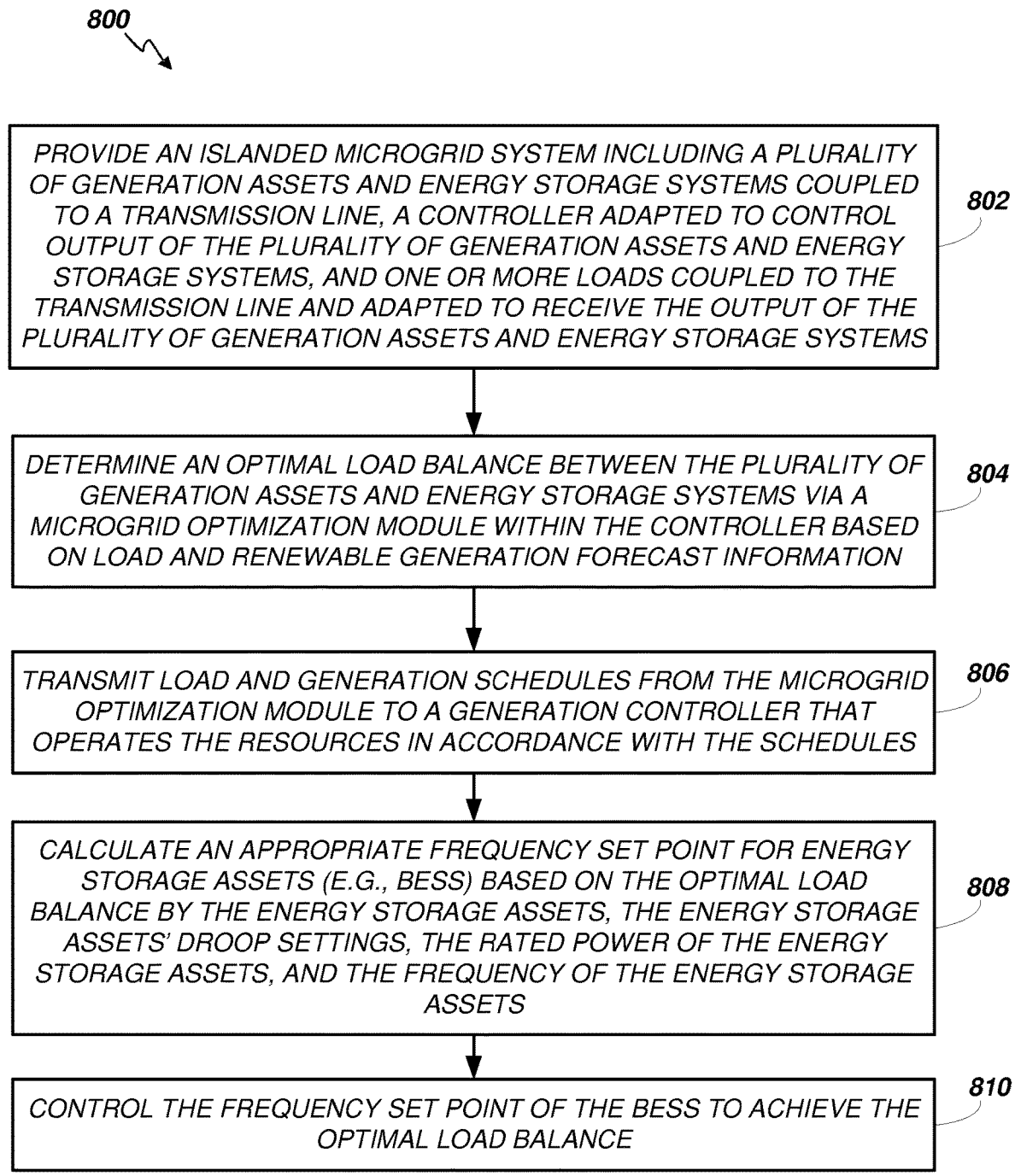
FIG. 8 is a flowchart illustrating an example method of controlling load sharing between an isochronous generator and a battery energy storage system (BESS) using frequency set points according to some embodiments.

Turning now to FIG. 8, a flowchart depicting an example method 800 according to embodiments is depicted. The method 800 controls power production in an islanded microgrid system while maintaining the microgrid system frequency and implementing the desired load sharing between different types of generating or energy storage units. An islanded microgrid system is provided including a plurality of generation assets and energy storage systems coupled to a transmission line, a controller adapted to control output of the plurality of generation assets and energy storage systems, and one or more loads coupled to the transmission line and adapted to receive the output of the plurality of generation assets and energy storage systems (802). A microgrid optimization module within the controller receives load and renewable generation forecast information and uses it to determine an optimal load balance between the plurality of generation assets and energy storage systems (804). The microgrid optimization module provides load and generation schedules to a generation controller that operates the resources in accordance with the schedules (806). Load sharing can be specified in terms of active power output (i.e., kW) of each resource. When resources are in P/Q mode the generation controller can send the active power set point to the resources. For diesel generators a kW set point can be sent even in F/V droop mode, but for resources like the BESS that operate in F/V droop mode, the load sharing is achieved by sending an appropriate frequency set point. Based on a relationship (as described above) defined by the desired load sharing by the BESS, the BESS droop setting, rated power of the BESS, and frequency of the BESS, the load sharing can be achieved by calculating an appropriate frequency set point for the BESS (808) (as described above) and then controlling the frequency set point of the BESS to achieve the desired load sharing (810) (e.g., transmitting the frequency set point to the BESS controller).

Figure 9:
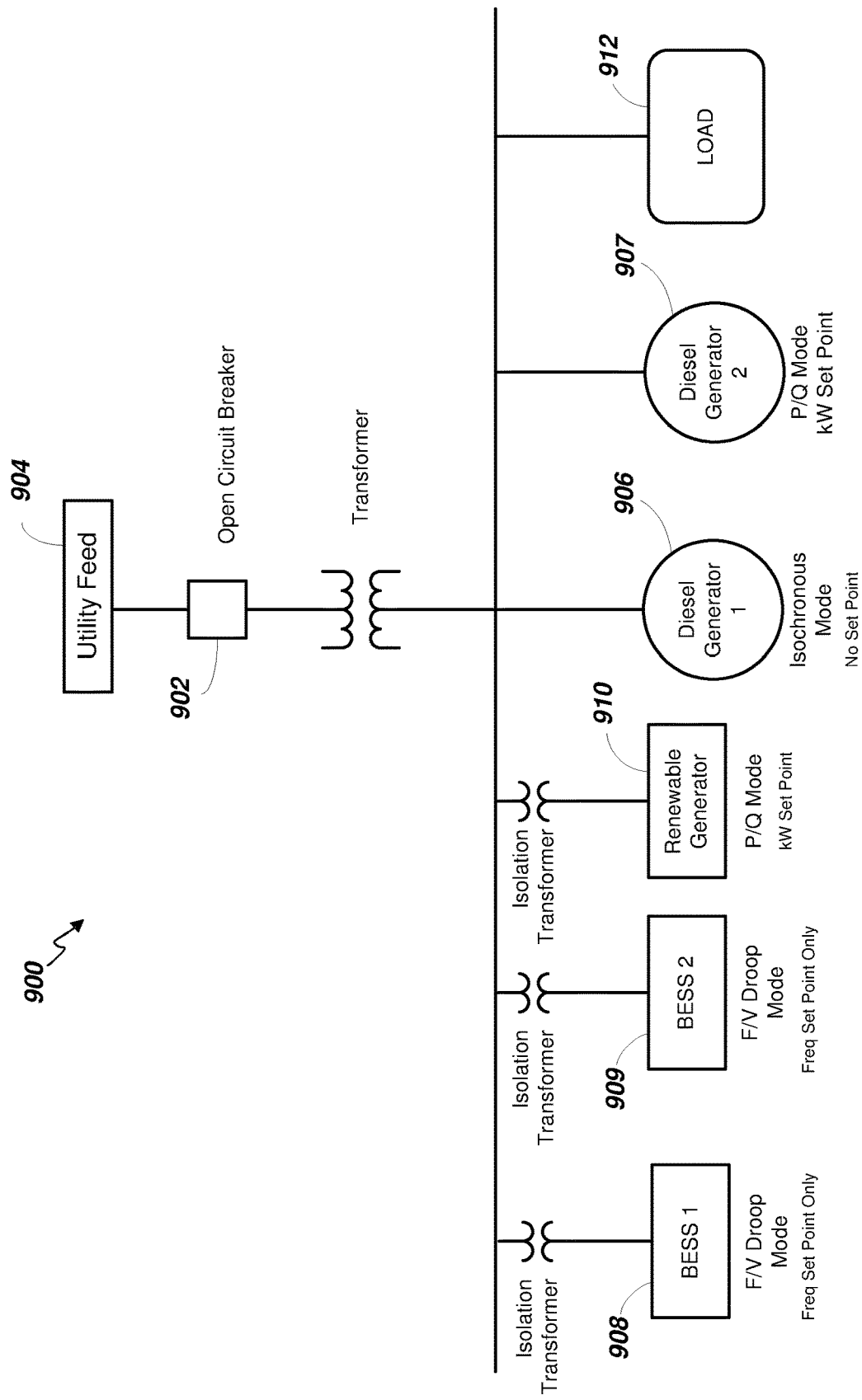
FIG. 9 is a block diagram depicting another example microgrid power system according to some embodiments.

FIG. 9 depicts another example embodiment of an islanded microgrid system 900 that includes multiple droop controlled BESS, multiple diesel generators, and a renewable generation asset supporting the load 912. In the pictured microgrid configuration, the circuit breaker 902 between the utility feed 904 and the islanded microgrid system 900 is open so that the microgrid system 900 is disconnected from the utility feed 904. The microgrid system 900 includes diesel generator 906 functioning as a generating resource operating as an isochronous generator. Diesel generator 906 does not accept set points and thus, the only control options available for this generator 906 are start and stop. Diesel generator 907 operates in P/Q mode and is operative to receive updated kW set points. Two BESS 908, 909 operating in F/V droop mode with a non-zero droop setting are also present in this example. The BESS 908, 909 accept only frequency set points as indicated.

The example microgrid system 900 further includes a renewable energy generator (renewable generation asset 910) that operates in P/Q mode and accepts active power (e.g., kW) set points. Diesel generator 1 906 operates in isochronous mode without a set point from the SCADA controller (not shown in FIG. 9). Diesel generator 2 907 and renewable generation asset 910 operate in P/Q mode with power set points that get updated. BESS 1 908 and BESS 2 909 are battery storage systems with different capacities and droop settings. Both BESS 1 908 and BESS 2 909 operate in F/V droop mode and thus, receive frequency set points.

The microgrid optimization module (MOM 110, FIG. 1) determines the generation schedules and sends updated kW set points to the microgrid generation and storage assets. The kW set points can be sent to the renewable generation asset 910 and diesel generator 2 907.

Figure 10:
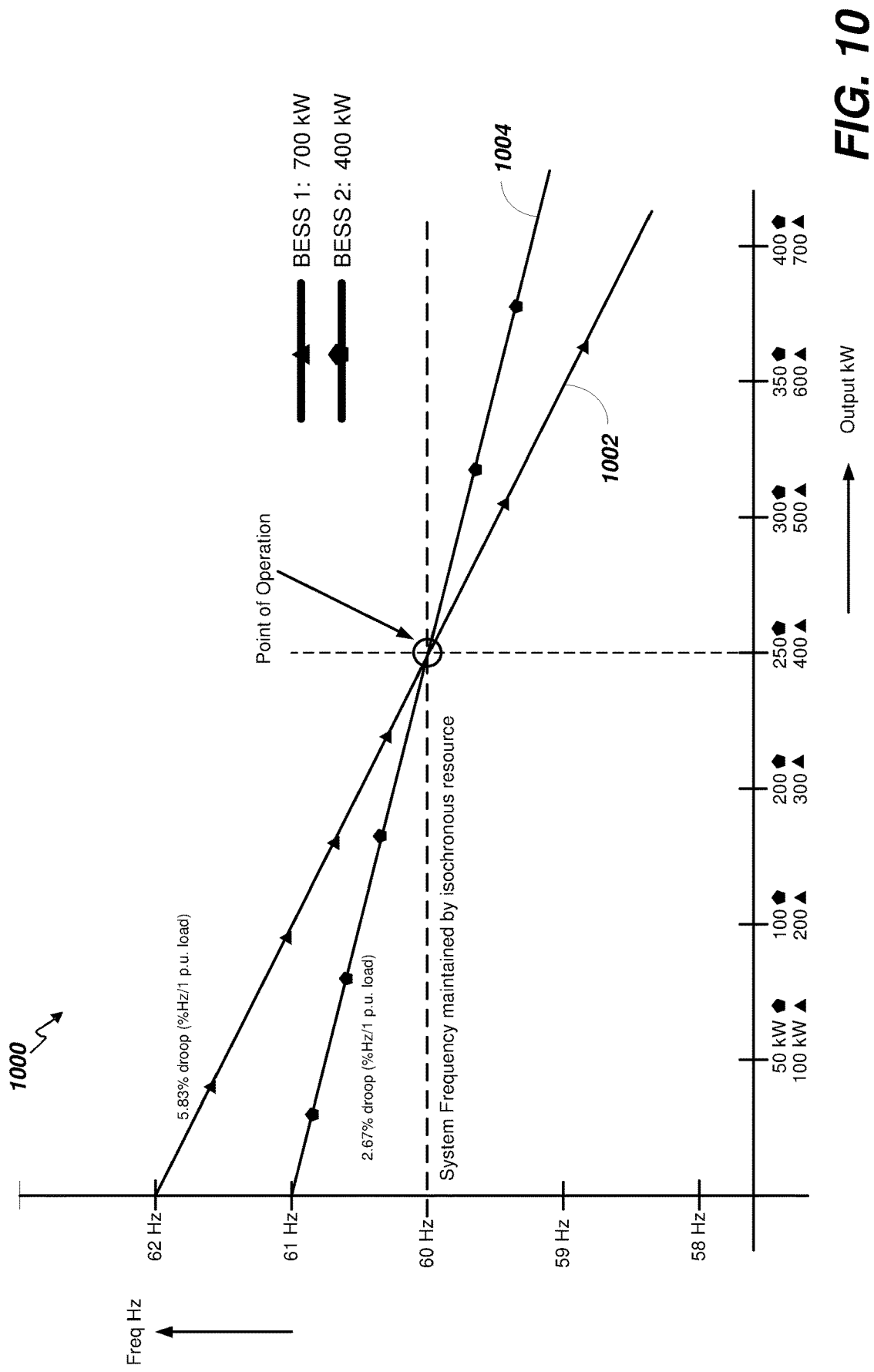
FIG. 10 is a graph depicting an example of controlling load sharing between isochronous generators and battery energy storage systems (BESS) using frequency set points according to some embodiments.

FIG. 10 depicts a graph 1000 illustrating an example frequency set points calculation for two frequency droop resources with different capacities and different droop settings. The example graphically represents load sharing for BESS 1 908 and BESS 2 909 of FIG. 9 with capacities of 700 kW and 400 kW, respectively.

The droop of BESS 1 908 is set to 5.83% (i.e., a 5.83% change in frequency for 100% change in output). The droop of BESS 2 909 is set to 2.67% (i.e., a 2.67% change in frequency for 100% change in output). In this example, the BESS 1 908 and BESS 2 909 are expected to share the load of 400 kW and 250 kW respectively. With a system frequency of 60 Hz, the calculation from power set point to frequency set point is illustrated in the graph 1000 of FIG. 10 based on:

$$F_{setpt} = \frac{P_{desired} \times Droop_{bess} \times F_{rated}}{P_{rated}} + F_{system}$$

Where $F_{setpt}$ represents the BESS Frequency set point (Hz); $F_{system}$ represents the System frequency (Hz); $Droop_{bess}$ represents the P. U. Droop setting for the BESS; $F_{Rated}$ represents the BESS rated frequency (Hz); $P_{desired}$ represents the Desired power sharing by the BESS; and $P_{Rated}$ represents the Rated power of BESS. For BESS 1 908 and BESS 2 909, the frequency set points are calculated at 62 Hz and 61 Hz, respectively. Thus, the point of operation for BESS 1 908 is found at the intersection of the BESS 1 908 operating line 1002 and the system frequency line. Likewise, the point of operation for BESS 2 909 is found at the intersection of the BESS 2 909 operating line 1004 and the system frequency line.

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s)

may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

The Title (set forth at the beginning of the first page of this disclosure) is not to be taken as limiting in any way as the scope of the disclosed invention(s).

The term "product" means any machine, manufacture and/or composition of matter as contemplated by 35 U.S.C. § 101, unless expressly specified otherwise.

Each process (whether called a method, class behavior, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display.

The present disclosure may refer to a "control system", application, or program. A control system, application, or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases and/or data structures are described, it will be understood by one of ordinary skill in the art that (i) alternative database structures to those described may be readily employed, and (ii) other memory structures besides databases may be readily employed. Any illustrations or descriptions of any sample databases/data structure presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" generally refers to an energy delivery network. However, in some embodiments, an information or computing network can be used that provides an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PRO- TOCOLS, ALGORITHMS, AND SOURCE CODE IN C, John Wiley & Sons, Inc. 2d ed., 1996, which is incorporated by reference in its entirety.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

The foregoing description discloses only exemplary embodiments of the invention. Modifications of the above disclosed apparatus and methods which fall within the scope of the invention will be readily apparent to those of ordinary skill in the art. For example, although the examples discussed above are illustrated for an electricity market, embodiments of the invention can be implemented for other markets.

Accordingly, while the present invention has been disclosed in connection with exemplary embodiments thereof, it should be understood that other embodiments may fall within the spirit and scope of the invention, as defined by the following claims.

What is claimed is:

1. A power distribution system comprising:
    a plurality of power generating resources and energy storage resources operating within a microgrid, the energy storage resources including a battery energy storage system (BESS) operable in frequency/voltage (F/V) droop mode, and the power generating resources including a fuel based generator operable in isochronous mode;
    a plurality of power consuming loads within the microgrid;
    a power transmission network coupling the resources to the loads; and
    a controller in communication with the resources and configured to control operation of the resources within the microgrid when the microgrid is islanded, wherein the controller is operative to:
        determine an optimal load balance between the plurality of power generating resources and energy storage resources via a microgrid optimization module within the controller based on load and renewable generation forecast information;
        transmit load and generation schedules from the microgrid optimization module to a generation controller that operates the resources in accordance with the schedules;
        calculate a frequency set point for the BESS operating in F/V droop mode in the microgrid based on optimal load balance droop settings of the BESS, a rated power of the BESS, and a rated frequency of the BESS, wherein the optimal load balance droop settings are a non-zero value of power [P] corresponding to a set frequency value or a non-zero value of power [P] corresponding to a voltage value; and
        control the frequency set point of the BESS to achieve the optimal load balance such that the BESS is providing all necessary power for a load while the fuel based generator is off,
    wherein the energy storage resources include a plurality of BESS operating in F/V droop mode, the plurality of BESS including the BESS, and
    wherein the frequency set point ($F_{setpt}$) for the BESS is determined based on:

$$F_{setpt} = \frac{P_{desired} \times Droop_{bess} \times F_{rated}}{P_{rated}} + F_{system}$$

wherein $F_{setpt}$ represents the BESS Frequency set point, $F_{system}$ represents a system frequency, $Droop_{bess}$ represents a droop setting of the BESS, $F_{Rated}$ represents a BESS rated frequency, $P_{desired}$ represents a desired power sharing of the BESS, and $P_{Rated}$ represents a rated power of the BESS.

2. The power distribution system of claim 1 wherein the power generating resources include a plurality of fuel based generators operating in isochronous mode, the plurality of fuel based generators including the fuel based generator.

3. The power distribution system of claim 1 wherein the power generating resources include one or more renewable energy generators operating in power/reactive power (P/Q) mode.

4. The power distribution system of claim 1 wherein the controller includes the microgrid optimization module and a generation controller coupled to the plurality of power generating and energy storage resources and in two way communication with the microgrid optimization module.

5. The power distribution system of claim 4 wherein the controller further includes a load and generation forecast module operative to provide the load and renewable generation forecast information to the microgrid optimization module.

6. A method of controlling an islanded microgrid, the method comprising:
    determining an optimal load balance between a plurality of generation assets and energy storage systems via a microgrid optimization module implemented within a controller based on load and renewable generation forecast information, wherein the optimal load balance includes load and generation schedules, and wherein the energy storage systems include a battery energy storage system (BESS) operable in frequency/voltage (F/V) droop mode, and the generation assets include a fuel based generator operable in isochronous mode;

transmitting the load and generation schedules from the microgrid optimization module to a generation controller that operates the plurality of generation assets and energy storage systems in accordance with the schedules;

calculating a frequency set point for the BESS operating in F/V droop mode in the microgrid based on optimal load balance droop settings of the BESS, a rated power of the BESS, and a rated frequency of the BESS, wherein the optimal load balance droop settings are a non-zero value of power [P] corresponding to a set frequency value or a non-zero value of power [P] corresponding to a voltage value; and controlling the frequency set point of the BESS to achieve the optimal load balance such that the BESS is providing all necessary power for a load while the fuel based generator is off, wherein determining an optimal load balance between a plurality of generation assets and energy storage systems includes determining an optimal load balance between the generation assets and a plurality of BESS operating in F/V droop mode, the plurality of BESS including the BESS, and wherein calculating a frequency set point for the BESS includes computing the frequency set point ($F_{setpt}$) for the BESS based on:

$$F_{setpt} = \frac{P_{desired} \times Droop_{bess} \times F_{rated}}{P_{rated}} + F_{system}$$

wherein $F_{setpt}$ represents the BESS Frequency set point, $F_{system}$ represents a system frequency, $Droop_{bess}$ represents a droop setting of the BESS, $F_{Rated}$ represents a BESS rated frequency, $P_{desired}$ represents a desired power sharing of the BESS, and $P_{Rated}$ represents a rated power of the BESS.

7. The method claim 6 wherein determining an optimal load balance between a plurality of generation assets and energy storage systems includes determining an optimal load balance between the energy storage systems and a plurality of fuel based generators operating in isochronous mode, the plurality of fuel based generators including the fuel based generator.

8. The method claim 6 wherein determining an optimal load balance between a plurality of generation assets and energy storage systems includes determining an optimal load balance between the energy storage systems and one or more renewable energy generators operating in power/reactive power (P/Q) mode.

9. The method of claim 6 wherein controlling the frequency set point of the BESS includes transmitting the frequency set point to a BESS controller.

10. An islanded microgrid controller comprising:

a microgrid optimization module operative to determine an optimal load balance between a plurality of generation assets and energy storage systems based on load and renewable generation forecast information, the energy storage systems including a battery energy storage system (BESS) operable in frequency/voltage (FN) droop mode and the generation assets including a fuel based generator operable in isochronous mode, the microgrid optimization module being further operative to calculate a frequency set point for the BESS based on optimal load balance droop settings of the BESS, a rated power of the BESS, and a rated frequency of the BESS, wherein the optimal load balance droop settings are a non-zero value of power [P] corresponding to a set frequency value or a non-zero value of power [P] corresponding to a voltage value;

a load and generation forecast module operative to provide the load and renewable generation forecast information to the microgrid optimization module; and a generation controller coupleable to the plurality of generation assets and energy storage systems and in two way communication with the microgrid optimization module, wherein the generation controller is operative to receive load and generation schedules from the microgrid optimization module, to operate the plurality of generation assets and energy storage systems in accordance with the schedules, and to control the frequency set point of the BESS to achieve the optimal load balance such that the BESS is providing all necessary power for a load while the fuel based generator is off, wherein the energy storage systems include a plurality of BESS operating in FN droop mode, the plurality of BESS including the BESS, and wherein the frequency set point ($F_{setpt}$) for the BESS is determined based on:

$$F_{setpt} = \frac{P_{desired} \times Droop_{bess} \times F_{rated}}{P_{rated}} + F_{system}$$

wherein $F_{setpt}$ represents the BESS Frequency set point, $F_{system}$ represents a system frequency, $Droop_{bess}$ represents a droop setting of the BESS, $F_{Rated}$ represents a BESS rated frequency, $P_{desired}$ represents a desired power sharing of the BESS, and $P_{Rated}$ represents a rated power of the BESS.

11. The islanded microgrid controller of claim 10 wherein the generating assets include a plurality of fuel based generators operating in isochronous mode, the plurality of fuel based generators including the fuel based generator.

12. The islanded microgrid controller of claim 10 wherein the generating assets include one or more renewable energy generators operating in power/reactive power (P/Q) mode.

13. The islanded microgrid controller of claim 10 further comprising a historical load and generation database coupled to the load and generation module.

14. The islanded microgrid controller of claim 13 wherein the load and generation module is operative to receive a weather data feed and to access the historical load and generation database to generate the load and renewable generation forecast information provided to the microgrid optimization module.

* * * * *